May 28, 1940.   C. R. JORDAN, SR   2,202,585
AUTOMOTIVE TOOL
Filed Oct. 9, 1939    2 Sheets-Sheet 2
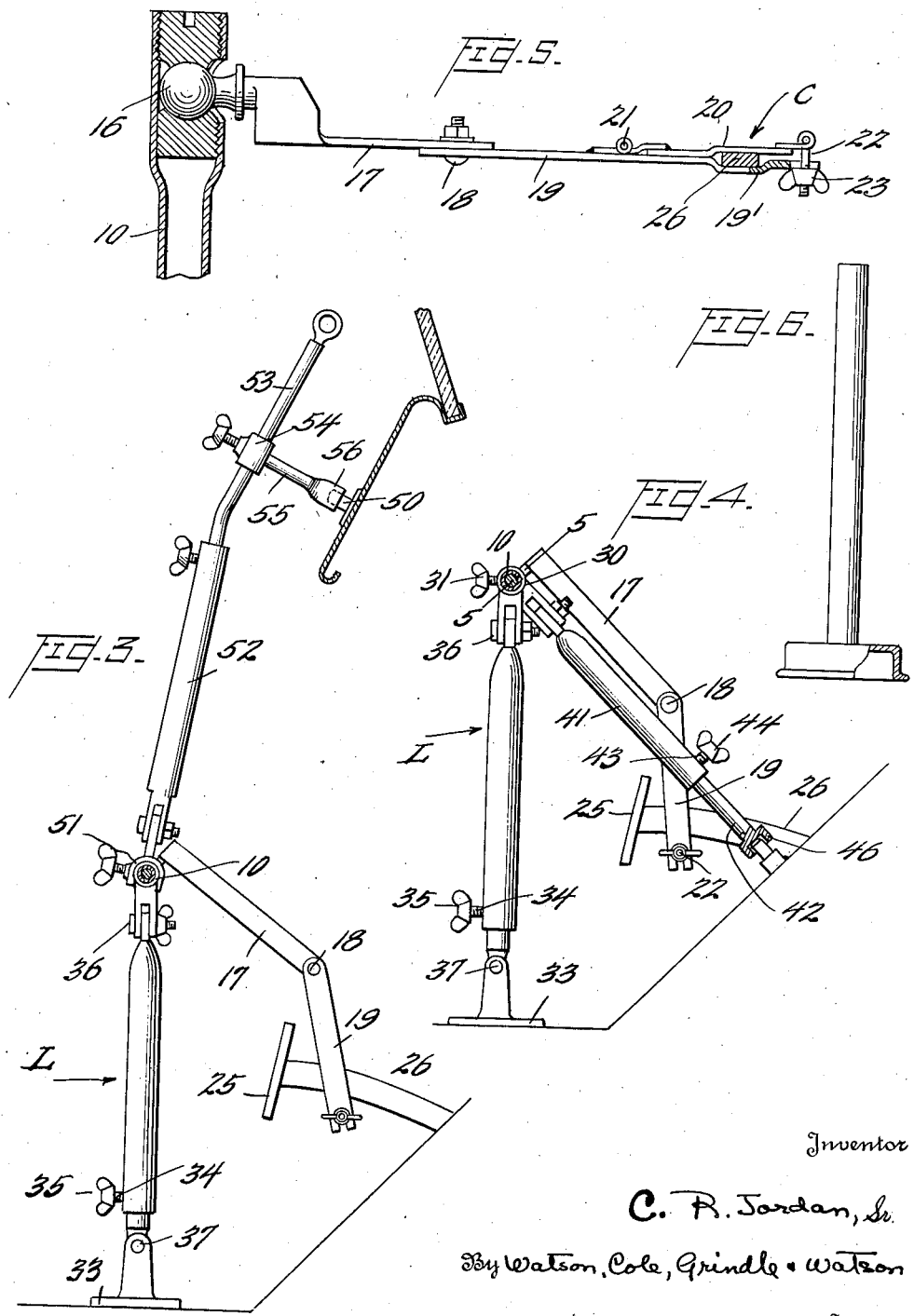

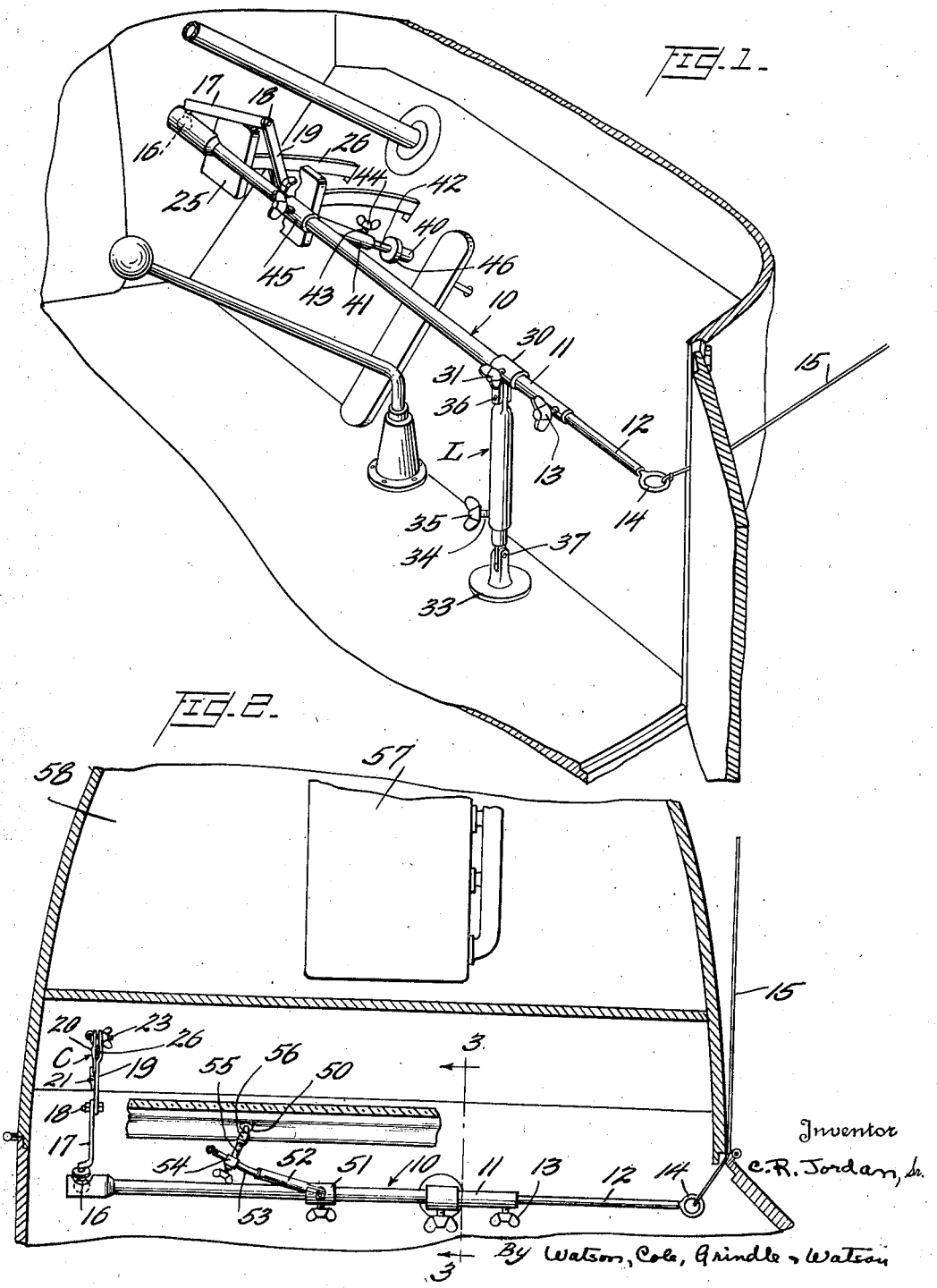

Patented May 28, 1940

2,202,585

UNITED STATES PATENT OFFICE 2,202,585

AUTOMOTIVE TOOL

Cedric Roy Jordan, Sr., Marion, S. C., assignor of twenty-seven and one-half per cent to William D. Cross and twenty-seven and one-half per cent to Rupert B. Gasque, both of Marion, S. C.

Application October 9, 1939, Serial No. 298,720

7 Claims. (Cl. 74—481)

The present invention relates to tools of the type or class which may be generally designated automotive tools, being primarily intended for use in the repair of motor vehicles, including passenger automobiles, trucks, busses, and other commercial vehicles.

The modern motor vehicle, quite regardless of whether it is intended for use as a pleasure or commercial vehicle, is provided with a space for an operator and a separate space for the prime mover or internal combustion engine. Conveniently located in the space set aside for the occupancy of the operator of the vehicle are the various engine and vehicle controlling devices such as for instance the steering wheel, the clutch and gear controls, the brake levers, and the starter switch button. The engine space is usually in advance of that provided for the operator and in practically all instances is sealed from the operator's space, or partitioned in such manner that engine fumes, etc., do not pass into the operator's space.

While it is quite essential that the two spaces referred to should be adequately separated one from the other, this arrangement at times is highly inconvenient, particularly when the motor vehicle engine is undergoing certain types of repair operations. Thus, for instance, when the valves of the internal combustion engine power plant are undergoing adjustment, it is necessary that the engine crankshaft, and cam shaft, be turned through a partial revolution from time to time, as is well-known. This partial revolution of the crankshaft may, of course, be effected manually by a crank at the front end of the motor vehicle but this is a comparatively laborious method of effecting the desired result and it is now the universal practice of repairmen to effect partial rotation of the engine crank and cam shafts by operating the engine starting motors for very short periods of time. Thus, to rotate the cam shaft through a relatively small angle, the starter button is depressed momentarily and the desired effect obtained, the starter motor serving as the power means for effecting the desired shaft rotation. The internal combustion engine starter button is located in the compartment set aside for the vehicle operator and hence the mechanic engaged in the process of adjusting the valves must either leave his position adjacent the engine, and enter or reach into the operator's compartment in order to reach the starter button, or must summon the aid of a second repairman who will enter the operator's compartment of the vehicle and manipulate the starter button in accordance with the signals or directions of the mechanic engaged in effecting the desired valve adjustments.

It is clear that there is a substantial amount of time necessarily expended in effecting the cam shaft rotation, whether this is done by a single mechanic, who moves from the engine to the operator space and back again, or by a second mechanic located in the operator space, which may hardly be called productive. It is the purpose of the present invention to provide means for saving the time heretofore wasted because of the isolation of the engine starter button from the mechanic performing the valve adjusting operation and to, in effect, temporarily bring the engine starter button into the reach of a mechanic stationed at his valve adjusting post so that, without lifting his eyes from the valves which he is engaged in adjusting, or taking a step away from this position, he has full and complete control over the engine starter circuit and can produce the desired movement of the cam shaft. Thus a single mechanic can perform with great ease an operation which has heretofore either required a much longer time or the assistance of a second mechanic. A novel tool is provided which is so designed and constructed as to be readily adaptable to all types of motor vehicles and which can be adjusted to effect the actuation of an engine starter switch button wherever it may be placed in the vehicle operator's space. For instance, certain engine starter buttons are placed upon the instrument panels of the operator space, others upon the floor boards, and a third variety of starting switch is controlled by actuation of a throttle pedal. The tool contemplated by the present invention, however, may be said to be of universal character and can be readily adjusted to effect the actuation of the starter switch wherever it may be placed.

By way of example, one embodiment of the invention is illustrated in the accompanying drawings and this will hereinafter be described in detail. It will be appreciated, however, by one skilled in the art that certain changes in the design and arrangement of the component elements of the invention may be effected if desired without loss of advantage or departure from the teachings thereof.

In the drawings:

Figure 1 is a perspective view of portion of a motor vehicle, showing the tool applied thereto, the forward portion of the operator's space of a passenger vehicle being illustrated and several of the controlling instrumentalities being shown;

Figure 2 is a horizontal section through portion of a motor vehicle, showing the novel tool in the operator space and also showing portion of the engine space and the engine;

Figure 3 is a section on line 3—3 of Figure 2 but on a larger scale;

Figure 4 is a similar view but showing the tool adjusted to effect the operation of a starter button located in a position different from the position of the starter button shown in Figure 3;

Figure 5 is a section on line 5—5 of Figure 4; and

Figure 6 is a side elevation, partially broken away, of one of the elements of the invention.

Generally speaking, the improved tool is in the nature of a lever which is provided with means at one end by which it may be attached to a stationary portion of the motor vehicle so as to be movable about a point or axis, provided with second means for constraining the lever to movements about said point or axis in a substantially horizontal plane, together with an element such as a cord which extends from the free end of the lever to a point adjacent the engine space and by means of which forces intended to rock the lever may be applied thereto and, finally, a means or element associated with the lever and adapted to communicate the movements of the lever under the influence of the cord, to the starter button. Hence with the assistance of the tool described, the mechanic may at will operate the starter button to effect energization of the starter and rotation of the engine crankshaft. When the operating shaft cord is released or relieved of tension, the engine starter button spring will return the starter button to initial position and hence return the lever to initial position. The lever is so designed and constructed that it may be readily applied to any type of motor vehicle, is simple and quite inexpensive to fabricate.

The preferred embodiment of the device which is illustrated includes the elongated member 10 which may if desired be telescopic, as shown, having a tubular section 11 into which telescopes the rod-like member 12 of smaller diameter, a wing nut 13 being provided to secure members 11 and 12 in desired relative positions and a ring 14 to which the operating cord 15 may be tied or suitably attached. At its other end the tubular member 11 is provided with a ball and socket joint device of conventional form, which is indicated at 16, and the ball of this ball and socket or universal joint has connected thereto a bracket 17, as shown in Figure 5. Bracket 17 in turn has pivotally secured to its outer or free end, as by means of a bolt 18, a link 19 provided with a clamping device generally indicated at C by means of which it may be clamped to a stationary part of the vehicle. This clamp includes, in the form of the invention illustrated, in addition to the stationary portion 19' which comprises an extension of the link 19, a swinging jaw 20 hingedly connected to the member 19 at 21 and having pivotally secured upon its outer end a bolt 22 upon which is mounted the thumb nut 23. A clutch pedal is indicated at 25 in Figure 1 of the drawings and the reciprocable member upon which the pedal is mounted is indicated at 26 in Figures 1 and 5.

It will be perceived that the bracket arm 17 overlies the clutch pedal 25 and that the clamp C embraces the reciprocatory clutch actuating element 26. The pedal 25 and element 26 are stationary parts of the machine during the time that the vehicle is undergoing repair and the means just described, therefore, is for the purpose of attaching one end of the lever-like member 10 to a stationary portion of the machine. At a point quite remote from the pivotal connection of the member 10 to the bracket 17 is the supporting leg generally indicated at L, this leg including a sleeve 30 slidably mounted upon the tubular member 11 and provided with a thumb nut 31 for frictionally securing the sleeve to the member 10 in any desired position of adjustment. To the sleeve the supporting leg is pivotally connected and to the lower end of the supporting leg is pivotally connected a foot 33 which is adapted to rest upon the floorboard of the vehicle. It will be observed that the leg L is telescopic and therefore extensible and contractible, a locking screw 34 provided with a wing nut 35 being arranged to secure two telescoping portions of the leg in any desired relative positions of adjustment. It will also be observed that the pivotal connection between the upper end of the leg L and the sleeve 11, which pivotal connection is generally indicated at 36, provides for angular movement of the leg in a plane which includes the axis of the member 10 and that the pivotal connection between the lower end of the leg and the foot 33, which pivotal connection is indicated at 37, provides for swinging motion of the foot 33 in a plane transverse to the axis of the lever member 10. By means of the pivotal connections just described, the operator may rapidly and freely position the supporting leg in the vehicle as he desires and, as will also be clear, the lower pivotal connection 37 permits rocking movement of the leg L about the foot 33 and hence movement of the lever member forwardly and rearwardly of the vehicle as the cord 15 is tensioned and released, motion of the lever 10 being of course angular and about the center of the ball joint 16 as an axis.

Intermediate the ball joint 16 and the supporting leg L is means for transmission of the rocking movements of the lever member to a starter button. In Figure 1 the starter button is on the inclined floorboard of the vehicle body, the button being indicated at 40. An operating arm disposed at substantially a right angle to the lever member 10 comprises the telescoping outer tubular and inner rod-like members 41 and 42, held in desired relationship by means of a locking screw 43 provided with a wing nut 44. The upper end of the tubular member 41 is rigidly attached to a sleeve 45 slidably mounted upon the tubular member 11 of the lever 10 and the outer or lower end of the rod-like member 42 of the arm is provided with a cup-shaped element 46 which is adapted to receive and fit over the upper end of the starter button 40, there being no chance that slippage may result between the starter button operating arm just described and the starter button itself by the provision of the recessed member 46.

With the parts adjusted in the manner shown in Figure 1, and as just above described, it is clear that forward rocking movement of the rocking lever 10 about the ball and socket joint 16 may be easily effected by tensioning the cord 15 and that, as a result of this rocking movement, the starter button 40 will be depressed. Needless to say, the starter motor circuit will be closed, the starter motor energized, and the engine and cam shafts rotated as long as the starter motor switch is maintained closed. Upon release of the cord 15, the conventional spring which is associated with the starter button effects movement of the starter button to inoperative position and return of the lever member 10 to its initial position.

It sometimes happens that a starter switch operating button is positioned on the instrument panel of the motor vehicle, for instance placed in some such position as indicated at 50 in Figure 2. In the event that this is the case, the lever member 10 of the tool may be attached and supported exactly as heretofore described but instead of the starter button actuating lever illustrated in Figure 1 a different type of arm is provided. Thus in Figure 2 the sleeve 51, which is slidably mounted upon the lever member 10, has pivotally secured thereto a hollow tubular element 52 and projecting within the element 52 is a rod or extension 53. Upon rod 53 is slidably supported a sleeve 54 to which is rigidly attached a radially extending arm 55 provided with a cupped enlargement 56 which engages the button 50. Rocking of the lever member 10 in the manner heretofore described, by means of the cord 15, therefore effects actuation of the button 50 and opening and closing of the engine starter motor circuit as desired. Still other forms of the invention may be designed and constructed to meet varying circumstances, although the tool shown in the drawings may be applied to practically every make of passenger and commercial motor vehicle now known by adjusting the various component elements of the device which have been designed particularly to permit such adjustment. For instance, the lever member 10 may be anchored to the base of the steering column if desired, or to the brake pedal, or to some other stationary portion of the vehicle. Likewise, while the tool is primarily designed for use in a motor vehicle in which the engine 57 is within an engine space 58 in advance of the operator's space the tool will be useful to perform its intended functions if the engine is placed in rear of the operator's space, the only change required being to provide a pulley over which the operating cord may be passed and thus directed rearwardly.

Having thus described the invention, what is claimed as new and desired to be secured by Letters Patent is:

1. A tool of the type described comprising in combination, an elongated member having means whereby it may be attached to a stationary portion of a motor vehicle for rocking movement about an axis, second means spaced from said first means for supporting said member for rocking movement in a generally horizontal direction about said axis, a tension element for applying a substantially horizontally directed force to said member to effect rocking movement thereof, and a device mounted on said member for transmitting the motion thereof to a starter switch button when said member is rocked about said axis.

2. A tool of the type described comprising in combination, an elongated member having means at one end whereby it may be detachably secured to a stationary portion of a motor vehicle for universal movement about a point, second means spaced from said first means for supporting said member for movement about said point in a generally horizontal direction, a tension element attached to said member and by means of which rocking forces may be applied thereto, and a device mounted on said member for transmitting the motion thereof to a starter switch button when said member is rocked about said point.

3. The combination set forth in claim 1 in which the member attaching means includes a clamp for clamping a foot pedal.

4. The combination set forth in claim 1 in which said second means comprises a post disposed in a generally vertical direction and having a foot to engage the floor of a motor vehicle.

5. The combination set forth in claim 1 in which said second means comprises a post pivotally connected to said member and a foot pivotally connected to the bottom of the post.

6. A tool of the type described comprising in combination, an elongated member having means whereby it may be attached to a stationary portion of a motor vehicle for rocking movement about an axis, second means spaced from said first means for supporting said member for rocking movement in a generally horizontal direction about said axis, a tension element for applying a substantially horizontally directed force to said member to effect rocking movement thereof, and an arm extending outwardly of said member for transmitting the motion thereof to a starter switch button when said member is rocked about said axis.

7. A tool of the type described comprising in combination, an elongated member having means whereby it may be attached to a stationary portion of a motor vehicle for rocking movement about an axis, second means spaced from said first means for supporting said member for rocking movement in a generally horizontal direction about said axis, a tension element for applying a substantially horizontally directed force to said member to effect rocking movement thereof, and an arm pivotally connected to said member and having a portion for engaging a starter switch button and transmitting the motion of said member thereto when said member is rocked.

CEDRIC R. JORDAN, Sr.